(12) United States Patent
Morris et al.

(10) Patent No.: US 8,901,239 B2
(45) Date of Patent: Dec. 2, 2014

(54) PROCESS FOR PREPARING A PARTICULATE SOLID, A PARTICULATE SOLID AND A DISPERSION

(75) Inventors: Daniel Morris, Manchester (GB); Martin Edwards, Manchester (GB)

(73) Assignee: Fujifilm Imaging Colorants Limited (GB)

( * ) Notice: Subject to any disclaimer, the term of this patent is extended or adjusted under 35 U.S.C. 154(b) by 0 days.

(21) Appl. No.: 13/990,575

(22) PCT Filed: Oct. 28, 2011

(86) PCT No.: PCT/GB2011/052099
§ 371 (c)(1),
(2), (4) Date: May 30, 2013

(87) PCT Pub. No.: WO2012/085522
PCT Pub. Date: Jun. 28, 2012

(65) Prior Publication Data
US 2013/0267648 A1   Oct. 10, 2013

(30) Foreign Application Priority Data

Dec. 20, 2010 (GB) .................................. 1021493.0

(51) Int. Cl.
| | |
|---|---|
| C08F 290/06 | (2006.01) |
| C08F 18/00 | (2006.01) |
| G03G 9/087 | (2006.01) |
| G03G 9/08 | (2006.01) |
| C08F 6/18 | (2006.01) |

(52) U.S. Cl.
CPC .............. *C08F 6/18* (2013.01); *G03G 9/08711* (2013.01); *G03G 9/08797* (2013.01); *G03G 9/0827* (2013.01); *G03G 9/08722* (2013.01); *G03G 9/08791* (2013.01); *G03G 9/0806* (2013.01); *G03G 9/08795* (2013.01)
USPC .......................................... 524/558; 526/320

(58) Field of Classification Search
CPC ...... C08F 6/18; G03G 9/0806; G03G 9/0827; G03G 9/08711; G03G 9/08791; G03G 9/08795; G03G 9/08797; G03G 9/08722
USPC ........................................... 524/558; 526/320
See application file for complete search history.

(56) References Cited

U.S. PATENT DOCUMENTS

| | | | |
|---|---|---|---|
| 5,922,501 A | 7/1999 | Cheng et al. | |
| 6,531,256 B1 * | 3/2003 | Bedells et al. | ........... 430/137.14 |
| 2005/0175921 A1 | 8/2005 | Morris et al. | |
| 2009/0053631 A1 | 2/2009 | Matsumura | |

FOREIGN PATENT DOCUMENTS

| | | |
|---|---|---|
| WO | 2008/135725 A1 | 11/2008 |
| WO | 2008/135726 A1 | 11/2008 |
| WO | 2009/053688 A2 | 4/2009 |

* cited by examiner

*Primary Examiner* — William Cheung
(74) *Attorney, Agent, or Firm* — Banner & Witcoff, Ltd.

(57) ABSTRACT

According to a first aspect of the present invention there is provided a process for preparing a particulate solid comprising the steps i) to iv): i) providing a dispersion of polymer particles in a liquid medium, said polymer being obtained or obtainable by the copolymerization of at least the monomers in components a) to d): a) 45 to 90 parts of one or more hydrocarbyl (meth) acrylates each having a homopolymer $T_g$ of from 90 to 130° C. and having no hydrophilic groups; b) 10 to 55 parts of one or more ethylenically unsaturated monomers each having homopolymer $T_g$ of below 90° C. and having no hydrophilic groups; c) 0 to 40 parts of one or more styrenic monomers having a homopolymer $T_g$ of at least 90° C. and having no hydrophilic groups; d) 0 to 10 parts of one or more ethylenically unsaturated monomers each having at least one hydrophilic group; wherein all the parts are by weight; ii) associating the particles to form clusters of particles; iii) optionally stabilizing the clusters; iv) heating the clusters above the glass transition of the polymer.

22 Claims, 6 Drawing Sheets

US 8,901,239 B2

PROCESS FOR PREPARING A PARTICULATE SOLID, A PARTICULATE SOLID AND A DISPERSION

RELATED APPLICATION DATA

This application is a National Stage Application under 35 U.S.C. 371 of co-pending PCT application PCT/GB2011/052099 designating the United States and filed Oct. 28, 2011; which claims the benefit of GB patent application number 1021493.0 and filed Dec. 20, 2010 each of which are hereby incorporated by reference in their entireties.

FIELD OF THE INVENTION

This invention relates to a process for preparing a particulate solid and to particulate solids prepared by said process. The particulate solids can contain many different kinds of materials coalesced within the polymer matrix. Examples of such materials include pigments, magnetite, charge control agents and waxes. Such particulate solids can be used in inks, paints, thermoplastics, thermosets and especially as toners for photocopiers and printers. The present invention also relates to a dispersion of polymer particles especially suitable for preparing said particulate solid.

BACKGROUND OF THE INVENTION

Many applications require a particulate solid particle comprising a polymer matrix. Often it is required that the particulate solid has a narrow particle size distribution and a particular desired shape.

For example, in the field of chemically produced toners for electrophotography it is desirable to have particulate solid particles having a narrow particle size distribution so as to provide suitable toners without the requirement for classification. Toner particles which are too big can cause a reduction in the resolution of the printed image and may mechanically damage the components of the printer or photocopier (e.g. scratched photoconductor surfaces). Toner particles which are too small can cause background development problems and may be difficult to clean from the surfaces of the components of the printer or photocopier (e.g. photoconductor). Similarly, toner particles which are too loosely fused or coalesced can mechanically break up, especially during the triboelectric charging process. Toner which is coalesced too much and is too spherical can be difficult to clean from the photoconductor drum if the transfer efficiency is not sufficiently high. Accordingly, for electrophotography the control of toner particle size distribution and shape is highly desirable.

Emulsion association (sometimes emulsion aggregation) is a known process to provide particulate solids (e.g. toner particles). In this process a dispersion of polymer particles along with other non-polymeric materials such as pigments and charge control agents are associated together to form clusters, the clusters are often grown and/or stabilised and then the clusters are heated to coalesce each cluster so forming the final particulate solid.

An example of this kind of approach is disclosed in PCT patent publication WO2009/053688.

We have found that the heating conditions used to coalesce the clusters can be quite severe. For example WO2009/053688 coalesces the clusters at a temperature of 115° C. This is an energy intensive step as the liquid medium is often water which has a high heat capacity. We have found that the heating step tends to destabilise the clusters such that they may continue to aggregate during the heating step. This results in an undesirable broadening of the particle size distribution and the production of a grit fraction of oversized material. Such grit often needs to be removed.

It is possible to use polymer particles wherein the polymer contains the repeat units from ethylenically unsaturated monomers having a hydrophilic group (e.g. hydroxy ethyl methacrylate). This tends to have the advantage of better stabilising the clusters to aggregation during the coalescence step but it can simultaneously inhibit and slow the coalescence of the clusters. This slowed coalescence means prolonged coalescence times and/or higher coalescence temperatures need to be utilised.

Also, when higher weight ratios of non-polymeric materials are incorporated into emulsion aggregation processes coalescence of the clusters become increasingly difficult and higher temperatures are needed.

Some of the components used in preparing emulsion association toners are thermally and/or hydrolytically unstable. For example some polymers, pigments, charge control agents, waxes or magnetic materials can be adversely affected by the prolonged heating step especially in an aqueous liquid medium.

Some components used in preparing emulsion association toners are somewhat soluble in aqueous liquid media at elevated temperatures. In some cases prolonged exposure to higher temperatures can in effect strip components out of the particulate solid by dissolution.

The present invention is directed to address one or more of the abovementioned problems.

BRIEF DESCRIPTION OF THE FIGURES

Figures

SUMMARY OF THE INVENTION

Figure 1:
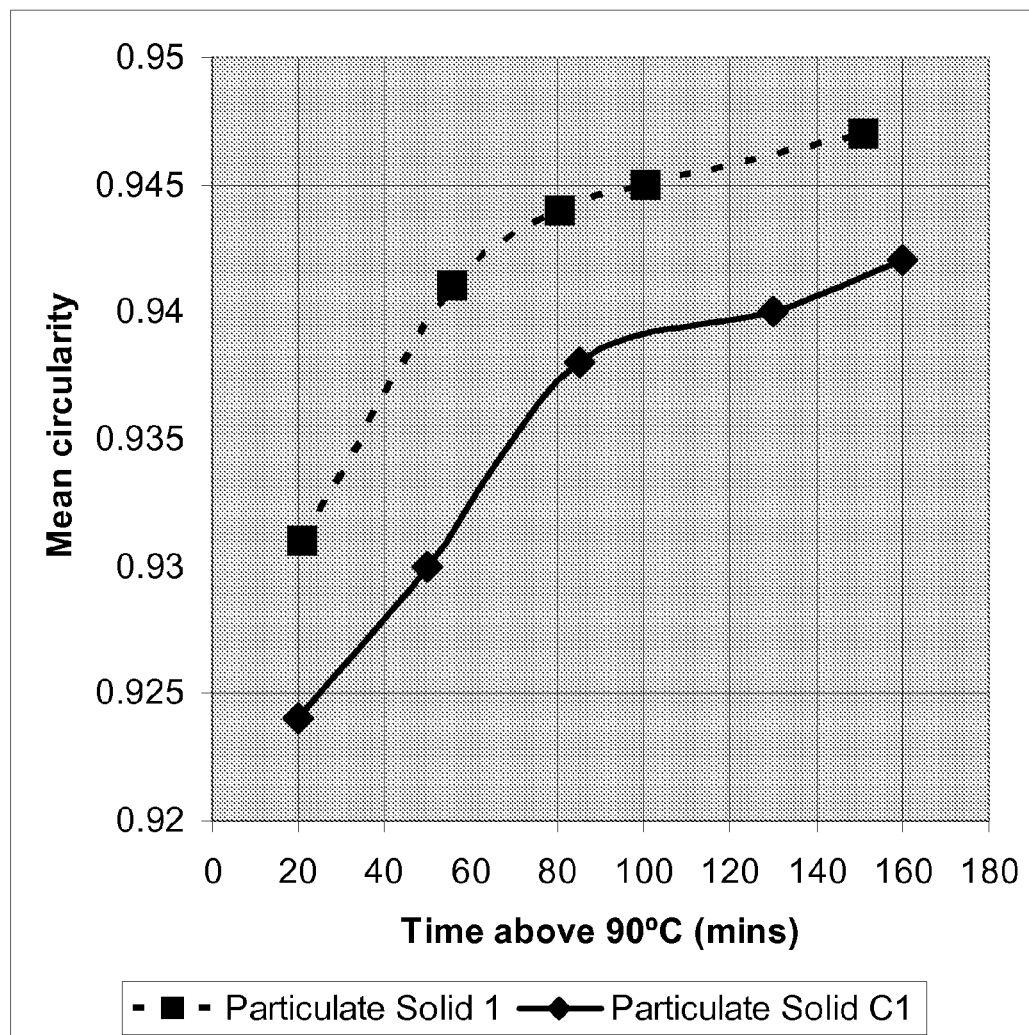
FIG. 1 shows the mean circularity (y co-ordinate) for Particulate Solids 1 and C1 both plotted against the coalescence time above 90° C. (x co-ordinate).

We initially considered that one possible route to achieving milder coalesce conditions would be to use a dispersion of polymer particles wherein the polymer has a lower glass transition temperature (hereinafter Tg). Such an idea follows the conventional notion that to coalesce the clusters the temperature in the heating step should exceed that of the Tg of the polymer. We found that this approach may generate several concomitant problems. For example, toners prepared using polymers having a lower Tg can become too fluid on the heated fuser rollers in the printer resulting in the prints wrapping around the heated rollers. In addition the toners made using this idea may more readily cake together when stored for long periods or in warmer environments. Such toners can also be softer which can lead to the formation of a contaminating polymer film on components of the photocopier and printer.

Accordingly, this approach has many limitations.

Emulsion association toners known in the art are prepared from polymer particles comprising predominantly styrene along with a hydrophilic (meth)acrylate and a low Tg (meth)acrylate having no hydrophilic groups. A typical composition might be 80 parts styrene, 18 parts n-butyl acrylate and 2 parts of acrylic acid.

The present invention is based, in part, on the surprising discovery that polymer particles containing substantial amounts of specific hydrocarbyl (meth) acrylates having a homopolymer Tg of 90 to 130° C. can be used to prepare clusters which coalesce using substantially milder heating conditions than the analogous polymer particle wherein styrene alone is used. This is surprising because styrene homopolymer has a Tg of about 95° C. so the difference in coalescence characteristics is not controlled by Tg effects.

First Aspect

According to a first aspect of the present invention there is provided a process for preparing a particulate solid comprising the steps i) to iv):
i) providing a dispersion of polymer particles in a liquid medium, said polymer being obtained or obtainable by the copolymerisation of at least the monomers in components a) to d):
   a) 45 to 90 parts of one of more hydrocarbyl (meth)acrylates each having a homopolymer Tg of from 90 to 130° C. and having no hydrophilic groups;
   b) 10 to 55 parts of one or more ethylenically unsaturated monomers each having homopolymer Tg of below 90° C. and having no hydrophilic groups;
   c) 0 to 40 parts of one or more styrenic monomers having a homopolymer Tg of at least 90° C. and having no hydrophilic groups;
   d) 0 to 10 parts of one or more ethylenically unsaturated monomers each having at least one hydrophilic group;
wherein all the parts are by weight;
ii) associating the particles to form clusters of particles;
iii) optionally stabilising the clusters;
iv) heating the clusters above the glass transition of the polymer.

DEFINITIONS

As used herein the words such as "a" and "an" are meant to include the possibility of having more than one of that item. For example "a" dispersion also includes the possibility of having more than one dispersion.

Of course, in regard of single phase polymers for example this means one and only one phase.

DETAILED DESCRIPTION OF THE INVENTION

Step i) Providing a Dispersion of Polymer Particles

The dispersion of polymer particles used in step i) may be prepared synthetically or the dispersion may be purchased from commercial sources. The present invention and its claims do not require the preparation or synthesis of the dispersion as a required part of the process.

When the dispersion of polymer particles is prepared synthetically this may be done by any suitable method including solution dispersion, suspension polymerisation and especially emulsion polymerisation methods.

A preferred emulsion polymerisation method is to copolymerise a mixture of the monomer components a) to d) and any other optional monomers in an aqueous liquid medium. The polymerisation is preferably effected by an initiator which is preferably a thermal or redox initiator. The initiator may be of any suitable kind but free radical initiators are preferred. In some cases the polymer particles in the dispersion are self dispersing. In this case the monomer components making up the polymer particles colloidally stabilise the polymer particle. In other cases the polymer particles in the dispersion are stabilised by the presence of one or more surfactants. Preferably, these surfactants are at least partially adsorbed onto the surface of the polymer particles. Of course, it is possible to have polymer particles which are self stabilised and which also have one or more surfactants at least partially adsorbed onto their surface.

Hydrophilic Groups

The words hydrophilic groups as used throughout mean those groups which would tend to solubilise or disperse the polymer particles in step i) when in an aqueous liquid medium (especially when in water). Examples of hydrophilic groups include hydroxy (OH), carboxylic acid, phosphonic acid, phosphoric acid sulfonic acid, sulfuric acid, sulfonamide, optionally substituted amino, quaternary ammonium, pyridinium, benzalkonium, groups and polyethyleneoxy groups. Hydrophilic groups may be ionic or non-ionic. The hydrophilic ionic groups may be cationic or anionic. Hydrophilic cationic groups include quaternary ammonium, benzalkonium, pyridinium, guanide and biguanide groups. Hydrophilic acidic groups include sulfonic acid, sulfuric acid, phosphonic acid, phosphoric acid and carboxylic acid. Examples of non-ionic hydrophilic groups include polyethyleneoxy and —OH groups. In the monomers of components a), b) and c) these hydrophilic groups are absent whilst in the monomers of component d) these groups are present.

Glass Transition Temperature (Tg)

The glass transition temperature of the homopolymers is preferably established by differential scanning calorimetry (DSC). The Tg is preferably taken as being the midpoint value from a re-heat DSC scan (i.e. after an initial heat and cool). In the method of measurement, a differential scanning calorimeter preferably a TA Q1000 is used with the measurement procedure comprising heating from −20 to 150° C. at 15° C./minute, followed by cooling rapidly to −20° C. and then re-heating to 150° C. at 15° C./minute. The Tg is preferably taken as the midpoint value from the re-heat scan.

The homopolymer used to determine the Tg is preferably prepared so as to have a number averaged molecular weight (Mn) of at least 50,000, more preferably at least 100,000. More preferably, the homopolymer used to determine the Tg is prepared so as to have a weight averaged molecular weight (Mw) of at least 100,000, more preferably at least 250,000 Preferably the Mn and Mw value is established by gel permeation chromatography (GPC) by reference to polystyrene standard polymers.

Preferably, the homopolymer is atactic. Preferably the homopolymers are prepared by emulsion polymerisation using free radical initiators. In this way the polymer tacticity is uncontrolled.

Good data for homopolymer Tgs can also be found by reference to the Polymer Handbook.

Liquid Medium

The liquid medium in the dispersion in step i) is preferably aqueous, more preferably the liquid medium comprises water and no other liquid.

In many cases it is preferred that the liquid medium in step i) has a pH of 5 or more, more preferably 7 or more. Such a pH is especially suited to particles which are stabilised by carboxylic acid groups.

Component a)

Preferably, the hydrocarbyl group in the hydrocarbyl (meth)acrylate monomers comprises carbon and hydrogen atoms only.

The hydrocarbyl group is preferably a $C_{1-30}$, more preferably a $C_{1-15}$ and especially a methyl group. The hydrocarbyl groups may comprise aromatic or aliphatic groups or a mixture thereof. Suitable aromatic groups include phenylene, phenyl, naphthylene and naphthyl groups. Suitable aliphatic groups include $C_{1-30}$ alkylene and alkyl groups. The hydrocarbyl group may be linear or branched. The hydrocarbyl group may be a cyclic or a cage structure. Preferred hydrocarbyl groups are phenyl, tert-butyl, cyclohexyl, isobornyl and especially methyl.

Preferably, component a) is or comprises one or more of the following monomers phenyl methacrylate, tert-butyl methacrylate, cyclohexyl methacrylate, isobornyl acrylate and isobornyl methacrylate and especially methyl methacrylate. In general methacrylates are preferred over acrylates for the monomers in component a).

Of these we have found that methyl methacrylate is particularly effective at facilitating milder coalescing conditions in step iv) of the present process. This was considered by the inventors to be entirely unexpected since the Tg value for poly (methyl methacrylate) is identical to that for polystyrene. Accordingly, component a) preferably comprises and especially is methyl methacrylate.

Preferably, the monomers in component a) each have a homopolymer Tg of from 90 to 120 and especially from 95 to 110.

Preferably, component a) is present at from 50 to 90 parts, more preferably, 55 to 90 parts, even more preferably 60 to 90 parts and especially 70 to 90 parts by weight.

Component b)

The ethylenically unsaturated monomers in component b) are preferably selected from alkyl (meth)acrylates, butadiene and isoprene. Preferred alkyl (meth)acrylates are those having a linear $C_2$-$C_{30}$ alkyl chain. Suitable linear n-alkyl chains include ethyl, propyl, butyl, pentyl, hexyl, octyl, decyl, nonyl and stearyl. Some suitable alkyl chains do have branching, examples of which include isopropyl, sec-butyl, iso-butyl and 2-ethyl hexyl. Of these n-butyl and 2-ethyl hexyl groups are especially preferred.

Preferred examples of monomers for component b) include n-butyl (meth) acrylate, n-hexyl (meth)acrylate, 2-ethylhexyl (meth)acrylate and n-octyl (meth) acrylate. Of these the acrylates rather than the methacrylates tend to be preferred for the monomers of component b). Most preferred monomers for component b) include n-butyl acrylate and 2-ethylhexyl acrylate. Of these n-butyl acrylate is especially preferred. Preferably, component b) is n-butyl acrylate.

Preferably, the monomers in component b) each have a homopolymer Tg of less than 30° C., more preferably less than 0° C., even more preferably less than −20° C. and especially less than −40° C. These lower Tgs are useful in that the polymer particles can have the desired overall Tg whilst only incorporating relatively small amounts of the monomers in component b). Preferably, the homopolymer Tg for the monomers in component b) is above −150° C. and especially above −100° C.

Preferably, component b) is present at from 10 to 50 parts, more preferably 10 to 45 parts, even more preferably 10 to 40 parts and especially 10 to 30 parts by weight.

Component c)

The presence of repeat units from the monomers of component c) in the polymer particles is entirely optional. In some cases component c) is absent. In which case the polymer particles provided in step i) contain no repeat units from styrenic monomers having a homopolymer Tg of at least 90° C. and having no hydrophilic groups.

Preferred styrenic monomers for component c) include halo-styrenes, $C_{1-6}$alkyl substituted styrenes, nitrostyrenes, cyanostyrenes and especially styrene itself.

Preferably, the homopolymer Tg of the styrenic monomers is from 90 to 130° C., more preferably from 95 to 110° C. and especially from 95 to 105° C.

Preferably component c) is present at from 0 to 30, more preferably from 0 to 20, especially from 0 to 10 and most especially from 0 to 5 parts by weight. More preferably, component c) is 0 parts by weight, i.e., the monomers in component c) are absent from the polymer.

In other cases where it is desirable to provide a more hydrophobic particulate solid, component c) is preferably present at from 1 to 30 parts, more preferably from 5 to 30 parts and especially from 10 to 30 parts by weight.

Component d)

The monomers in component d) may be any ethylenically unsaturated monomer without limitation provided they have the required hydrophilic groups. Preferred monomers for component d) include (meth)acrylates and styrenics each substituted with one or more of the aforementioned hydrophilic groups. Of these (meth)acrylates substituted with one or more hydrophilic groups are preferred.

Preferred hydrophilic groups for inclusion into the monomer structures in component d) include sulfonic acid, phosphonic acid, polyethyleneoxy, optionally substituted amine and especially carboxylic acid and hydroxy groups. Of these hydroxy groups are particularly preferred.

Preferably, the polymer particles present in step i) comprise one or more polymers having hydroxy (OH) groups.

Preferably component d) is or comprises a hydroxy and/or carboxylic acid functional (meth)acrylate.

Hydroxy groups have been found to be especially useful at preventing the clusters from further associating during the heating step iv). The presence of hydroxy groups thus helps to retain narrow particle size distributions formed in the association step. However, we have found that such groups tend to impair or slow the rate of cluster coalescence/fusion during the heating step. Thus, when hydroxy functional monomers are present in component d) the heating conditions in step iv) required for coalescence tend to be more severe and can damage more sensitive materials to be incorporated into the final particulate solid. Thus an especially desirable aspect of the present invention is that it permits the use of monomers in component d) having hydrophilic groups which sometimes tend to slow down cluster coalescence (e.g. OH groups) whilst mitigating against the usually required more severe heating conditions. This is thought to arise at least in part because of the beneficial effects from the monomers in component a) in comparison to polymers containing high proportions of styrene repeat units.

Preferably component d) is or comprises a hydroxy functional (meth)acrylate.

Preferred examples of monomers in component d) are hydroxy substituted alkyl (meth)acrylates. Particularly preferred is 2-hydroxy ethyl methacrylate. Preferably component d) is 2-hydroxy ethyl methacrylate.

In some cases it can be advantageous that the monomer(s) in component d) each have at least one acid group (sulfonic acid, phosphonic acid and especially carboxylic acid group).

This can assist the association process when the pH adjustment is used. It can also allow the polymer particles to be colloidally stably without any surfactant being present at all. This has the advantage that the final particulate solid need not be purified at all, or need not be purified as much, to remove the surfactants. The inclusion of monomers in component d) having acid hydrophilic groups can also assist in further lowering the required coalescence temperatures.

Suitable monomers for component d) containing carboxylic acid groups include acrylic acid, beta-carboxyethylacrylate, itaconic acid, crotonic acid, maleic acid, fumaric acid, methacryloyloxyethylsuccinate and especially methacrylic acid.

The monomers in component d) may all have hydroxy groups, they may all have carboxylic acid groups or the monomers may be a mixture some having carboxylic acid and some having hydroxy groups.

Preferably, component d) is present at from 0 to 7 parts, more preferably from 0 to 5 parts, even more preferably 0.1 to 5 parts, especially preferably from 1 to 5 parts and most especially from 1.5 to 3.5 parts by weight. When component d) comprises hydroxy functional monomers, these amounts provide the best balance of colloidal stability during the heating step iv) whilst not overly inhibiting coalescence.

Optional Monomers Copolymerised to Form the Polymer

In component e) monomers other than those in components a) to d) may optionally also be copolymerised to form the polymer particles. Examples of monomers in component e) include acrylonitrile and methacrylonitrile. Preferably, such monomers are present at no more than 25 parts, more preferably no more than 10 parts, especially no more than 5 parts and most especially no more than 1 part by weight. In many cases it is preferred that polymer particles are obtained from polymerising only the monomers in the components a) to d).

Overall Preferred Polymer Compositions

In view of the above mentioned preferences it is preferred that the polymer in the polymer particles in step i) is obtained or obtainable by the copolymerisation of:

50 to 90 parts of component a) and 10 to 50 parts of component b) and the amounts of components c) and d) as defined in the first aspect of the present invention;
wherein all parts are by weight, more preferably
  50 to 90, more preferably 60 to 90 parts of component a)
  10 to 50, more preferably 10 to 40 parts of component b)
  0 to 40 parts of component c)
  0 to 5 parts of component d)
wherein all the parts are by weight; even more preferably
  50 to 90, more preferably 60 to 90 parts of component a)
  10 to 50, more preferably 10 to 40 parts of component b)
  0 to 40 parts of component c)
  0.1 to 5 parts of component d)
wherein all the parts are by weight.

Preferably, the sum of all the components a) to d) and if present e) is 100 parts by weight. In which case the parts can be equally validly represented as weight % relative to the total monomers in the polymer.

A particularly preferred polymer in the polymer particles in step i) is obtained or obtainable by the copolymerisation of:
a) 50 to 90 parts, more preferably 60 to 90 parts of methyl methacrylate
b) 10 to 50 parts, more preferably 10 to 40 parts of n-butyl acrylate and/or 2-ethyl hexyl acrylate;
c) 0 to 30 parts of styrene;
d) 1 to 5 parts of one or more (meth)acrylates each substituted with one or more hydrophilic groups.

Component d) preferably comprises one or hydroxy or carboxylic acid functional (meth)acrylates. Of which methacrylic acid and especially 2-hydroxy ethyl methacrylate are preferred.

The polymer in the polymer particles in step i) preferably has a Tg of from 20 to 70° C., more preferably from 30 to 60° C., and especially from 40 to 60° C.

The polymer in the polymer particles in step i) may have a Tg of from 20 to 40° C., from 25 to 40° C. or from 30 to 40° C.

In both cases it is preferred that only one Tg is present as established by DSC.

We have found that particulate solids having a substantially spherical shape are more difficult to prepare when the polymer Tg is higher than 40° C., especially higher than 45° C. and more especially higher than 50° C. Such higher Tgs can be desirable to prevent the final particulate solid from caking or clumping together when stored in dry form in warmer environments.

Preferably, the polymer in the polymer particles has a number averaged molecular weight of from 1,000 to 1,000,000, more preferably from 1,000 to 100,000 and especially from 2,000 to 50,000 and most especially from 2,000 to 30,000. We have found that as the molecular weight increases it can become more difficult to form particulate solids with a spherical shape.

Preferably, the polymer in the polymer particles has a weight averaged molecular weight of from 1,000 to 1,000,000, more preferably from 1,000 to 500,000, even more preferably from 2,000 to 250,000 and especially from 2,000 to 100,000.

Preferably, the molecular weights are measured by gel permeation chromatography (GPC). Preferably, the molecular weights are calculated relative to polystyrene standards. The GPC is preferably performed using tetrahydrofuran as the eluent.

Preferably, the polymeric particles have a single polymer phase (only one polymer phase). The polymer particle are preferably not multi phase with regard to the polymers present, for example not polymer core/polymer shell and not polymer particles within polymer particles. More preferably all the polymeric particles (including any optional further polymer particles) present in the dispersion have a single polymer phase. Preferably, the composition of all the polymeric particles present in the dispersion is such that the resulting final particulate solid will itself comprise only one polymeric phase. Thus, preferably all the polymeric particles can comprise single phase polymers which are compatible with each other.

Preferably, the single polymer phase nature of the polymer particles is confirmed by performing differential scanning calorimetry (DSC) and recording only one glass transition.

In the method of measurement, a differential scanning calorimeter preferably a TA Q1000 is used with the measurement procedure comprising heating the polymer particles from −20-150° C. at 15° C./minute, followed by cooling rapidly to −20° C. and then re-heating to 150° C. at 15° C./minute. The Tg is preferably taken as the midpoint value from the re-heat scan. Preferably, as mentioned above the polymer particles have only one glass transition. Even more preferably if the DSC is performed on the final particulate solid it only shows one glass transition temperature for the polymeric material.

The fusion or coalescence of single phase polymer particles is particularly difficult since it is not possible to rely on domains of polymer having a relatively low glass transition temperature to assist in coalescence and domains of polymer having a relatively high glass transition to provide suitable flow, storage and anti-blocking characteristics.

Preferably, the polymer particles comprise only polymers which have no anionic groups. More preferably all the polymer particles including any optional further polymer particles have no anionic groups. Anionic groups include for example sulfonic, phosphonic and carboxylic acids and salts thereof. We have found that whilst these groups assist in low temperature fusion and coalescence they tend to provide final toners where the triboelectric charge attained is very much influenced by humidity conditions.

Optional Components in the Polymer Particles

The polymer particles may have dissolved and/or dispersed within them a non-polymeric material. The non-polymeric materials may be of any kind without any particular limitation. Examples of non-polymeric materials include pigments, charge control agents and dyes. These non-polymeric additives may be included into the polymer particles in step i) such that the weight ratio of non-polymeric to polymeric material is from 1:99 to 60:40, more preferably 15:85 to 60:40, especially from 20:80 to 50:50.

In some cases the amount of non-polymeric material is from 0 to 10 parts, more preferably from 0.1 to 10 parts by weight.

Preferably, all of the non-polymeric materials present in the particulate solid have a water solubility of not more than 2000 ppm, more preferably not more than 1000 ppm and especially not more than 500 ppm. The solubility is preferably measured at a temperature of 25° C. The solubility is preferably measured in deionized water having a pH of about 7. By ppm we mean part per million by weight.

Stabilisation of the Polymer Particles

It is preferred that the polymer particles present in step i) are stabilised by groups which are reversibly ionisable. By stabilised we mean colloidally stabilised. By reversibly ionisable we mean groups which can switch between ionic and non-ionic forms depending on the conditions. Preferably, the reversibly ionisable groups are able to switch between ionic and non-ionic forms when the pH of the liquid medium is adjusted. The ionic form colloidally stabilises the polymer particles whilst the non-ionic form destabilises the polymer particles forcing them to associate.

Preferred groups of this kind are carboxylic acid groups and optionally substituted amino groups. Carboxylic acid groups can be converted from the stabilising ionic form which exists at a pH above 5 to an unstable non-ionic form which exists at a pH of 5 and below. Optionally substituted amine can be converted from the stabilising ionic (protonated) form which exists at a pH below 7, to the destabilising non-ionic form at a pH of 7 or more.

For polymer particles stabilised by carboxylic acid groups the liquid medium in step i) preferably has a pH of 5 or more, more preferably 7 or more and the association in step ii) is preferably effected by the addition of an acid.

For polymer particles stabilised by optionally substituted amine groups the liquid medium in step i) preferably has a pH of below 7, more preferably below 4 and the association in step ii) is preferably effected by the addition of a base.

The reversibly ionisable groups may be covalently attached to the polymer in the polymer particles. In this case such groups are preferably introduced by copolymerising at least one monomer in component d) which has at least one reversibly ionisable group (especially a carboxylic acid or optionally substituted amine group). These are self-stabilising polymer particles.

Preferred monomers in component d) having carboxylic acid groups include acrylic acid, beta-carboxyethylacrylate, itaconic acid, crotonic acid, maleic acid, fumaric acid, methacryloyloxyethylsuccinate and especially methacrylic acid.

The polymer particles may be stabilised by a surfactant which at least partially adsorbs onto the surface of the polymer particles. Preferred surfactants have reversibly ionisable groups as hereinbefore mentioned. Of these preferred surfactants have one or more carboxylic acid groups.

More preferred still are the fatty acid carboxylates (including alkyl carboxylates) and alkyl or aryl alkoxylated carboxylates. Examples of fatty acid carboxylates include salts of lauric acid, myristic acid, palmitic acid, stearic acid, oleic acid and the like. Most preferred still are the alkyl alkoxylated carboxylates, such as, e.g., alkyl ethoxylated carboxylates, alkyl propoxylated carboxylates and alkyl ethoxylated/propoxylated carboxylates, especially wherein the alkyl is $C_{8-14}$ alkyl. Suitable alkyl alkoxylated carboxylates are commercially available, such as in the Akypo™ range of surfactants from Kao Corporation and the Marlowet™ range of surfactants from Sasol.

Other suitable surfactants having carboxylic acid groups include the acrylic and styrene-acrylic copolymers. Suitable examples of which are those sold under the Carboset™ (Lubrizol) and Johncryl™ (BASF) tradenames.

It is possible to have polymer particles which are both self stabilised and surfactant stabilised.

Preferably, the polymer particles in step i) have a Z-average particle size of from 50 to 300 nm, more preferably from 50 to 200 nm in diameter. Preferably the particle size is measured by a dynamic light scattering (DLS) device. A suitable DLS device is the Zetasizer™ Nano ZS device from Malvern.

Optional Components in the Dispersion in Step i)

In addition to the polymer particles, the dispersion in step i) preferably also comprises one or more non-polymeric particles. Such non-polymeric particles may be added to the polymeric particles long before the association step or conversely they may be added to the polymeric particles at the very instant before association.

The non-polymeric particles may contain any non-polymeric material as previously defined and preferred.

Preferably, the non-polymeric particles are stabilised by a surfactant having one or more reversible ionisable groups as hereinbefore mentioned.

Preferably, all the particles in the dispersion in step i) are stabilised by the same kind of reversibly ionisable groups. For example, the particles may all be stabilised by carboxylic acid groups.

In one case, the weight ratio of non-polymeric particles to polymeric particles in the dispersion in step i) is from 1:99 to 60:40, more preferably from 15:85 to 60:40 and especially from 20:80 to 50:50.

In another case the weight ratio of non-polymeric particles to polymeric particles in the dispersion in step i) is from 0.1:99.9 to 10:90, more preferably from 1:99 to 10:90.

Preferably, the non-polymeric particles in step i) have a z-average particle size of from 50 to 500 nm, more preferably from 50 to 300 nm and especially from 50 to 200 nm in diameter. Preferably the particle size is measured by a dynamic light scattering (DLS) device. A suitable DLS device is the Zetasizer™ Nano ZS device from Malvern.

Suitable dispersions of non-polymeric particles may be prepared by comminution. For example milling of a non-polymeric solid in the presence of a liquid medium and a surfactant. Dispersions of non-polymeric materials such as pigments and charge control agents can be prepared in this way. It is preferred that the surfactant used in the milling step has reversibly ionisable groups as mentioned previously.

Non-polymeric particles may also be prepared by dissolving the non-polymeric material in an organic solvent so as to form a solution and dispersing the solution into an aqueous liquid medium. Typically the organic solvent is then removed by for example evaporation or membrane treatment. The organic solvent may be water-miscible or water-immiscible. It is preferred that the organic solvent has a boiling point below 100° C. such that it can be readily evaporated off. Suitable non-polymeric materials for this approach are dyes and other organic soluble materials. The dispersion of the solution is preferably done in a mixture of water and a surfactant. Preferably, the surfactant has reversibly ionisable groups as hereinbefore mentioned.

The dispersion in step i) may additionally comprise one or more further polymers which are not obtained or obtainable from copolymerising the components a) to d) in the previously mentioned proportions. Such a further polymer may be present in the polymer particles (where the polymer does meet all the requirements a) to d)) or such a further polymer may be present as a separate dispersion (separate further polymer particles).

A preferred kind of further polymer is a wax dispersion. Suitable waxes include polyethylene, polypropylene, paraffin, Fischer-Tropsch and carnauba waxes.

Another preferred kind of further polymer is a polycarbonate, polyurethane and especially a polyester.

When the further polymer is in the form of separate polymer particles these may comprise one or more non-polymeric materials. Such further polymer particles are preferably be prepared by solution dispersion routes.

Preferably, such further polymers either have reversibly ionisable groups within their structure and/or they are colloidally stabilised by surfactants which have one or more reversibly ionisable groups. Waxes may be present in the dispersion in step i) at from 0 to 30 weight percent based on all the solid material present in the dispersion. In some cases wax is preferably absent from the particulate solid.

In some cases it is preferred that of all the polymers present in the dispersion in step i) at least 50%, more preferably at least 75%, especially at least 90% and most especially at least 95% by weight of the polymers are obtained or obtainable by copolymerising the components a) to d) in the stated proportions.

Most preferably all the polymers present in the dispersion in step i) are obtained or obtainable by the copolymerising the components a) to d) in the proportions mentioned.

Non-Polymeric Material

As mentioned above non-polymeric material may be introduced into the polymer particles by means of:
a) a dispersion in step i) which comprises one or more non-polymeric particles; and/or
b) polymer particles [obtained or obtainable by copolymerising the components a) to d) in the proportions stated in step i)] which have dissolved and/or dispersed within them a non-polymeric material; and/or
c) the dispersion in step i) comprising further polymer particles [obtained or obtainable by copolymerising the components other than a) to d) in the proportions stated in step i)] which have dissolved and/or dispersed within them a non-polymeric material.

In one case, the final particulate solid contains both non-polymeric and polymeric material in a weight ratio from 1:99 to 60:40, more preferably from 15:85 to 60:40 and especially from 20:80 to 50:50.

When the amount of non-polymeric material is relatively low, preferably from 0 to 10%, more preferably from 0.1 to 10% by weight relative to particulate solid the benefits of the present invention in terms of increasing the ease of fusion and coalescence are especially dramatic. Such is evidenced by FIGS. 2 to 6.

When the amount of non-polymeric material is greater than 10%, and especially greater than 15% by weight relative to the particulate solid then fusion and coalescence of the clusters becomes slower and more difficult. Even in such circumstances the present invention still provides significantly reduced coalescence times or coalescence temperatures as evidenced by FIG. 1.

When the particulate solid is to be used as a filler it is preferred that all the non-polymeric materials present in the particulate solid are all colourless.

Step ii) Associating

The association step may be effected by any means which results in colloidal destabilisation and association without any particular limitation. It is possible to effect the association step by a number of methods including: the addition of salts, raising or lowering the temperature, adding a surfactant which has groups which are of opposite polarity to the groups stabilising the particles in the dispersion and adjusting the pH (of the liquid medium in the dispersion).

Association by Means of Adjusting the pH

The adjustment of pH is preferred not least because we have found that the particulate solid obtained by such an association step can be more readily purified than association by other techniques.

Preferably, the association is effected by the adjustment of the pH of the liquid medium by the addition of an acid or a base.

Preferably the pH change is at least 1, more preferably at least 2 and especially at least 3 pH units.

When the reversibly ionisable groups in the particles in step i) have carboxylic acid groups association is preferably effected by the addition of an acid. Preferred acids include sulphuric, hydrochloric and nitric acid. The change in pH is preferably as hereinbefore mentioned.

When the reversibly ionisable groups in the particles in step i) have optionally substituted amine groups association is preferably effected by the addition of a base. Preferred bases include sodium, lithium, potassium, calcium and magnesium hydroxide, carbonate or bicarbonate as well as ammonia, organic amines and alkanolamines. The change in pH is preferably as hereinbefore mentioned.

Optional Growth Step

Between steps ii) and iii) it is sometimes useful to grow the size of the clusters. This is preferably performed by gently heating the clusters to a temperature below or around the glass transition of the polymer in the polymer clusters.

The times for growth tend to be relatively short, for example preferably less than 5 hours, more preferably less than 4 hours.

In some cases the growth can be less than 3 hours, less than 2 hours or less than 1 hour. In other cases the growth step is absent so the effective time is 0 hours.

Step iii) Optionally Stabilising the Clusters

Once the desired cluster particle size is established, the clusters may be stabilised against further association, broadening of particle size distribution or growth in particle size. This may be achieved, for example, by addition of further surfactant, and/or by a change in pH to convert the reversibly ionisable groups back to their ionic form (e.g. in the case of carboxylic acid groups raising the pH back to at least 5, more preferably at least 7). Stabilisation against further growth by a change in pH is especially preferable where a pH adjustment process was employed for the association. In preferred embodiments, both addition of further (preferably ionic) surfactant and a change in pH are employed.

Step iv) Heating the Clusters

In step iv) the clusters are heated to coalesce the particles.

Preferably this is done above the Tg of the polymer in the clusters. Preferably, the heating in step iv) is performed at a temperature of from 20 to 100° C., more preferably from 40 to 100° C. and especially from 50 to 100° C.

In some embodiments it is possible to heat the clusters in step iv) at a temperature of no more than 90° C., more preferably no more than 85° C., especially no more than 80° C. and most especially no more than 75° C. In these cases the minimum coalescence temperature is preferably at least 50° C., more preferably at least 60° C. and especially at least 65° C.

Preferably, the clusters are heated in step iv) for no more than 10 hours, more preferably no more than 5 hours, especially no more than 3 hours and most especially no more than 1 hour. Preferably, the coalescence time relates only to the time at the target coalescence temperature. Such short heating times coupled with mild temperatures have been found to be particularly effective when thermally or hydrolytically sensitive materials are included into the particulate solids.

Particulate Solid

The final particulate solid preferably has a volume average particle size of from 0.5 to 30 microns, more preferably from 0.5 to 20 microns, especially from 1 to 15 microns and most especially from 2 to 10 microns in diameter. The volume average particle size is preferably measured by electro-zone sensing. A preferred apparatus for which is the Coulter Multisizer.

The particulate solid is preferably washed to reduce the remaining amounts surface contaminants such as surfactants and salts. Preferably, the washing is done by filtration. Preferably the wash liquid is water, especially pure water. The water may be purified by deionizer resin, reverse osmosis and/or distillation.

The particulate solid may be isolated from the liquid medium to obtain a dry powder. Preferably the isolation includes a step which concentrates the particulate solid in the liquid medium. Examples of the concentration step include filtration, coagulation, centrifugation and membrane treatment. Preferably the concentrate is dried by methods including spray drying, freeze drying, oven drying and especially by agitated drying. This may be done at atmospheric or reduced pressures. A preferred method is agitated vacuum drying.

The particulate solid may be mixed with surface additives especially those suitable for preparing electrophotographic toners. Suitable surface additives include silicon, titanium and aluminium oxide which are preferably hydrophobized. The amount of surface additives is often in the range of 0.1 to 5% by weight based on the toner particles, more preferably from 0.1 to 3% by weight.

Preferably, the particulate solid has a carefully controlled shape. The shape control is typically achieved by a tailored combination of the temperature and duration of heating used in step iv) along with the Tg of the polymer in the polymer particles and the accelerated coalescence caused by using the polymer as defined in step i) of the first aspect of the present invention.

Preferably, the average SF1 is at most 165. More preferably the average SF1 is from 100 to 150, especially from 105 to 150 and most especially from 110 to 145. Such shapes are especially suitable for toners.

The shape factor, SF1 for a single particulate solid particle, is defined as: $SF1=(ML)^2/A \times PI/4 \times 100$, where ML=maximum length across toner, A=projected area, PI is approximately 3.14.

The values of ML and A for each particle are preferably determined by electron microscopy, especially scanning electron microscopy. Preferably, the average SF1 value is the number average of 100 or 1000 particles.

In some cases the number averaged circularity is preferably from 0.80 to 0.99, more preferably from 0.80 to 0.98, even more preferably from 0.85 to 0.98 and especially from 0.90 to 0.98.

In some case very irregular shapes are preferred where the number averaged circularity is from 0.80 to 0.96, more preferably from 0.80 to 0.94.

In other cases the number averaged circularity is preferably from 0.80 to 1.0, more preferably from 0.90 to 1.0, especially from 0.93 to 1.0, more especially from 0.94 to 0.98 and even more especially from 0.95 to 0.98.

The circularity is defined as the ratio:

$$Lo/L$$

where Lo is the circumference of a circle of equivalent area to the particle, and L is the perimeter of the particle itself.

The number averaged circularity is preferably measured by an optical microscopy method. This is preferably fully automated for example we prefer to use a Flow Particle Image Analyser (for example the Sysmex™ FPIA). Preferably the circularity is the number average of at least 100, more preferably at least 1000 and especially at least 5,000 particles.

The advantages of the present invention are especially notable when close to spherical particle shapes are required since these tend to require long coalescence times or higher coalescence temperatures. We have observed that obtaining such close to spherical shapes is even more difficult in any one or more of the following circumstances:

a) when the total amount of non-polymeric material in the particulate solid is greater than 10% by weight, especially greater than 15% by weight;
b) when the overall (or averaged) Tg of the polymer in particulate solid is higher than 40° C., especially higher than 45° C. and more especially higher than 50° C.;
c) when the polymer in the particulate solid contains hydroxy groups;
d) when the weight averaged molecular weight of the polymer as determined by GPC exceeds 50,000, especially 100,000 daltons;

Preferably, the final particulate solid has a narrow distribution of particle sizes. Preferably the GSDv is less than 1.35 and more preferably less than 1.30. Preferably, the GSDv value is calculated by d84.1/d50 from the volume distributions. The volume distributions are preferably measured by an electrozone sensing device such as a Coulter Multisizer. GSDv values quoted herein are measured by this method.

Second Aspect

According to a second aspect of the present invention there is provided the particulate solid obtained or obtainable by the process according to the first aspect of the present invention.

Third Aspect

According to a third aspect of the present invention there is proved a dispersion as defined in step i) of the first aspect of the present invention.

The preferences for all aspects of this dispersion are as hereinbefore described. In particular the preferences for the polymer, the liquid medium and the particle stabilisation are as hereinbefore described.

As mentioned the liquid medium is preferably aqueous. Similarly the polymer particles are preferably stabilised by groups which are reversibly ionisable.

Use

The present process is especially suitable for preparing a particulate solid which is useful as a filler or an electrographic toner.

EXAMPLES

The present invention will now be further illustrated by the following non-limiting examples in which all parts are by weight unless stated to the contrary.

1. Polymer Particles 1.1 Preparation of a Dispersion of Polymer Particles (Latex 1)

A dispersion of polymer particles was synthesised by emulsion polymerisation. The monomers used were: component a) methyl methacrylate (75.9 wt %), component b) butyl acrylate (21.6 wt %) and component d) 2-hydroxyethyl methacrylate (2.5 wt %).

Ammonium persulphate (0.5 wt % based on weight of monomers) was used as the initiator, and a mixture of thiol chain transfer agents (2.5 wt % based on weight of monomers) was used to provide a polymer having a low molecular weight.

The surfactant (3 wt % based on weight of monomers, i.e. 3 wt parts surfactant for 100 wt parts monomers) was Akypo™ RLM100 (available from Kao), a carboxylated alkyl ethoxylate, i.e. a carboxy-functional anionic surfactant. The dispersion produced had a z-average particle size of 92 nm as measured by a Malvern Zetasizer™ Nano ZS. A sample of the dispersion was dried down for Differential Scanning calorimetry (DSC) and Gel Permeation Chromatography (GPC) analysis. The glass transition temperature (Tg) as measured by DSC was 51.6° C. GPC analysis against polystyrene standards showed the resin of the latex to have Mn=9,600, Mw=24,200, Mw/Mn=2.52. The solids content of the polymer particles in the dispersion was 29.0 wt %. This was designated Latex 1 and meets the requirements in step i) of the first aspect of the present invention.

1.2 Preparation of a Dispersion of Polymer Particles (Latex C1)

A dispersion of polymer particles was synthesised by emulsion polymerisation in the same way as Example 1.1 above except that the monomer composition was styrene (74.9 wt %), methyl methacrylate (4.2 wt %), butyl acrylate (18.4 wt %) and 2-hydroxyethyl methacrylate (2.5 wt %). The dispersion of polymer particles produced had a z-average particle size of 89 nm as measured by a Zetasizer™ Nano ZS. A sample of the dispersion was dried down for DSC and GPC analysis. The glass transition temperature (Tg) as measured by DSC was 51.3° C. GPC analysis against polystyrene standards showed the resin of the latex to have Mn=9,200, Mw=22,700, Mw/Mn=2.47. The solids content of the polymer particles in the dispersion was 29.1 wt %. This was designated Latex C1 and it does not meet the requirements in step i) of the first aspect of the present invention.

Further latexes 2 to 4 and comparative latexes C2 to C4 were made in the same way as Latex 1 and Latex C1 respectively with the monomer compositions as outlined in Table 1.

TABLE 1

Monomer compositions for Latexes 2 to 4 and for Comparative latexes C2 to C4

| Polymer Particles | MMA | Styrene | BA | HEMA |
|---|---|---|---|---|
| Latex 2 | 75.9 | 0.00 | 21.6 | 2.5 |
| Latex 3 | 56.8 | 20.00 | 20.7 | 2.5 |
| Latex 4 | 64.7 | 0.00 | 32.8 | 2.5 |
| Latex C2 | 4.2 | 76.40 | 16.9 | 2.5 |
| Latex C3 | 35.3 | 45.00 | 17.2 | 2.5 |
| Latex C4 | 4.2 | 63.60 | 29.7 | 2.5 |

In totality, this provided a series of latexes and comparative latexes with the compositions and properties as summarised in Table 2.

TABLE 2

Compositions and Properties of Polymer Latexes

| Polymer Particles | MMA | Styrene | BA | HEMA | Tg (° C.) | Mn | Mw | PS |
|---|---|---|---|---|---|---|---|---|
| Latex 1 | 75.9 | 0.00 | 21.6 | 2.5 | 51.6 | 9,600 | 24,200 | 92 |
| Latex 2 | 75.9 | 0.00 | 21.6 | 2.5 | 52.5 | 6,100 | 25,600 | 91 |
| Latex 3 | 56.8 | 20.00 | 20.7 | 2.5 | 48.7 | 6,400 | 23,600 | 71 |
| Latex 4 | 64.7 | 0.00 | 32.8 | 2.5 | 31.6 | 10,400 | 28,500 | 91 |
| Latex C1 | 4.2 | 74.90 | 18.4 | 2.5 | 51.3 | 9,200 | 22,700 | 89 |
| Latex C2 | 4.2 | 76.40 | 16.9 | 2.5 | 52.1 | 8,200 | 25,500 | 79 |
| Latex C3 | 35.3 | 45.00 | 17.2 | 2.5 | 49.8 | 7,500 | 23,300 | 74 |
| Latex C4 | 4.2 | 63.60 | 29.7 | 2.5 | 34.2 | 9,900 | 25,000 | 73 |

PS—means Z averaged particle size in nm.

2. Preparation of a Pigment Dispersion (Non-Polymeric Material)

2.1 Pigment Dispersion (Dispersion P1)

Pigment (C.I. Pigment Blue 15:3) was milled in water using a bead mill, with Akypo™ RLM100 (Kao) and Solsperse™ 27000 as surfactants. Solsperse™ 27000 is a non-ionic surfactant available from Lubrizol. The pigment solids content of the dispersion was 25.2% by weight. This was designated pigment dispersion P1.

Preparation of Particulate solids

3. Particulate Solids of the Present Invention 3.1-3.5 Preparation of Particulate Solid 1

3.1 Provision of a Polymer Dispersion (Step i)

Latex 1 (562.2 g), and the pigment dispersion (P1) (161.61 g, containing 40.8 g of C.I. Pigment Blue 15:3) and water (776.2 g) were stirred in a vessel to provide Mixed Dispersion 1.

3.2 Association (Step ii)

The temperature of Mixed Dispersion 1 was raised to 30° C. Over the course of 230 seconds Mixed Dispersion 1 was circulated through a high shear mixer and back into the vessel during which time 0.5N sulphuric acid (200 g) was added into the high shear mixer to cause association of particles. After acid addition the pH of the liquid medium was 1.8. This formed particle clusters.

3.3 Growth

The particle clusters formed in step 3.2 were heated for the next 3 hours (experiencing a maximum temperature of 51.4° C.) to grow the clusters. The clusters were then cooled to 41.4° C.

3.4 Stabilisation (Step iii)

A solution of sodium hydroxide 0.5 M (154 g) was added to the clusters from step 3.3 over 13 minutes to raise the pH to 7. A solution of sodium dodecylbenzenesulphonate (10 wt %, 51.0 g) as a surfactant was then added over 9 minutes. This had the effect of colloidally stabilising the clusters and preventing further particle size growth.

3.5 Coalescence of Clusters

The temperature of the clusters from step 3.4 was then raised to induce coalescence. The time taken to reach 90° C. was 55 minutes. Heating above 90° C. was continued for 150 minutes, during which the peak temperature experienced was 92.0° C. and the average temperature 91.5° C. Samples were withdrawn periodically to measure the circularity of the particles. At the end of the heating process the temperature was reduced to room temperature (25° C.) over approximately 30 minutes.

Coulter Multisizer™ analysis of particles above 2 μm in size showed the median volume particle size was 8.9 μm in diameter and the GSDv was 1.26. Observation using an optical microscope showed the resulting final particulate solid to be off-spherical, but with a relatively smooth shape. The particles appeared to be well coalesced. This was designated as Particulate Solid 1. Particulate Solid 1 contained 20 parts by weight of non-polymeric material (Pigment) to 80 parts by weight of polymeric material.

3.6 to 3.10 Preparation of Particulate Solid 2

3.6 Provision of a Polymer Dispersion (Step i)

Latex 1 (667.6 g), and the pigment dispersion (P1) (40.41 g, containing 10.2 g of C.I. Pigment Blue 15:3) and water (832 g) were stirred in a vessel to provide Mixed Dispersion 2.

3.7 Association (Step ii)

The temperature of Mixed Dispersion 2 was raised to 30° C. Over the course of 230 seconds Mixed Dispersion 2 was circulated through a high shear mixer and back into the vessel during which time 0.5N sulphuric acid (160 g) was added into the high shear mixer to cause association of particles. After acid addition the pH of the liquid medium was 1.7. This formed particle clusters.

3.8 Growth

The particle clusters formed in step 3.7 were heated for the next 3 hours (experiencing a maximum temperature of 51.1° C.) to grow the clusters. The clusters were then cooled to 41.3° C.

3.9 Stabilisation (Step iii)

A solution of sodium hydroxide 0.5 M (134 g) was added to the clusters from step 3.8 over 9 minutes to raise the pH to 7. A solution of sodium dodecylbenzenesulphonate (10 wt %, 51 g) as a surfactant was then added over 11 minutes. This had the effect of colloidally stabilising the clusters and preventing further particle size growth.

3.10 Coalescence of Clusters

The temperature of the clusters from step 3.9 was then raised to induce coalescence. The time taken to reach 90° C. was 45 minutes. Heating above 90° C. was continued for 135 minutes, during which the peak temperature experienced was 92.1° C. and the average temperature 91.7° C. Samples were withdrawn periodically to measure the circularity of the particles. At the end of the heating process the temperature was reduced to room temperature (25° C.) over approximately 30 minutes.

Coulter Multisizer™ analysis of particles above 2 μm in size showed the median volume particle size was 8.5 μm in diameter and the GSDv was 1.22. Observation using an optical microscope showed the resulting final particulate solid to be spherical. This was designated as Particulate Solid 2. Particulate Solid 2 contained 5 parts by weight of non-polymeric material (Pigment) to 95 parts by weight of polymeric material.

4. Comparative Particulate Solids

4.1 to 4.5 Preparation of Comparative Particulate Solid C1

4.1 Provision of a Polymer Dispersion (Step i)

Latex C1 (453.3 g), and the pigment dispersion (P1) (134.7 g, containing 34.0 g of C.I. Pigment Blue 15:3) and water (912 g) were mixed and stirred in a vessel to provide Mixed Dispersion C1.

4.2 Association (Step ii)

The temperature of the Mixed Dispersion C1 from step 4.1 was raised to 30° C. Over the course of 230 seconds the mixed dispersion was circulated through a high shear mixer and back into the vessel during which time 0.5N sulphuric acid (200 g) was added into the high shear mixer to cause association of particles. The pH after acid addition was 1.9. This formed particle clusters.

4.3 Growth

The particle cluster formed from step 4.2 were heated for the next 3 hours (experiencing a maximum temperature of 51.5° C.) to grow the clusters. The clusters were then cooled to 41.5° C.

4.4 Stabilisation (Step iii)

A solution of sodium hydroxide 0.5 M (155.7 g) was added to the clusters from step 4.3 over 16 minutes to raise the pH to 7. A solution of sodium dodecylbenzenesulphonate (10 wt %, 42.5 g) was then added over 11 minutes.

4.5 Coalscence (Step iv)

The temperature of the clusters from step 4.4 was then raised to induce coalescence. The time taken to reach 90° C.

was 42 minutes. Heating above 90° C. was continued for 160 minutes, during which the peak temperature experienced was 93.8° C. and the average temperature 92.4° C. Samples were withdrawn periodically to measure the circularity of the particles. At the end of the heating process the temperature was reduced to room temperature (25° C.) over approximately 30 minutes.

Coulter Multisizer™ analysis of particles above 2 μm in size showed the median volume particle size was 8.5 μm in diameter and the GSDv was 1.29. This was designated as Particulate Solid C1. Particulate Solid C1 contained 20 parts by weight of non-polymeric material (Pigment) to 80 parts by weight of polymeric material.

4.6 to 4.10 Preparation of Comparative Particulate Solid C2

4.6 Provision of a Polymer Dispersion (Step i)

Latex C1 (538.4 g), and the pigment dispersion (P1) (33.7 g, containing 8.51 g of C.I. Pigment Blue 15:3) and water (968 g) were mixed and stirred in a vessel to provide Mixed Dispersion C2.

4.7 Association (Step ii)

The temperature of the Mixed Dispersion C2 from step 4.6 was raised to 30° C. Over the course of 230 seconds the mixed dispersion was circulated through a high shear mixer and back into the vessel during which time 0.5N sulphuric acid (160 g) was added into the high shear mixer to cause association of particles. The pH after acid addition was 1.9. This formed particle clusters.

4.8 Growth

The particle cluster formed from step 4.7 were heated for the next 3 hours (experiencing a maximum temperature of 51.2° C.) to grow the clusters. The clusters were then cooled to 41.3° C.

4.9 Stabilisation (Step iii)

A solution of sodium hydroxide 0.5 M (136 g) was added to the clusters from step 4.8 over 11 minutes to raise the pH to 7. A solution of sodium dodecylbenzenesulphonate (10 wt %, 42.5 g) was then added over 9 minutes.

4.10 Coalscence (Step iv)

The temperature of the clusters from step 4.9 was then raised to induce coalescence. The time taken to reach 90° C. was 43 minutes. Heating above 90° C. was continued for 217 minutes, during which the peak temperature experienced was 93.2° C. and the average temperature 92.5° C. Samples were withdrawn periodically to measure the circularity of the particles. At the end of the heating process the temperature was reduced to room temperature over approximately 30 minutes.

Coulter Multisizer™ analysis of particles above 2 μm in size showed the median volume particle size was 8.4 μm and the GSDv was 1.26. This was designated as Particulate Solid C2. Particulate Solid C2 contained 5 parts by weight of non-polymeric material (Pigment) to 95 parts by weight of polymeric material.

5. Results

Figure 2:
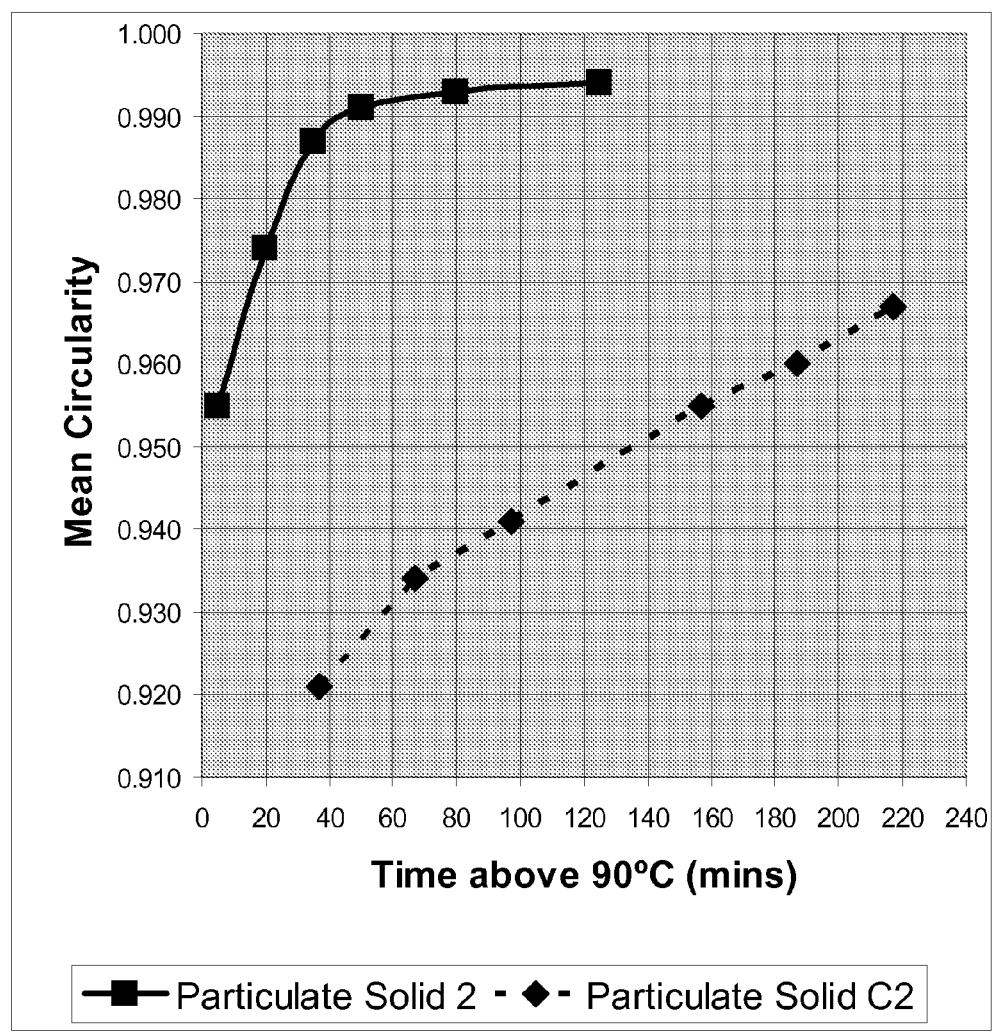
FIG. 2 shows the mean circularity (y co-ordinate) for Particulate Solids 2 and C2 both plotted against the coalescence time above 90° C. (x co-ordinate).

Tables 3, 4 and FIGS. 1 and 2 show how the mean circularity for Particulate Solids 1 and 2 (square-shaped data points) and Particulate Solid C1 and C2 (diamond-shaped data points) change with heating time above 90° C. The circularity was measured with a Sysmex FPIA 3000, analysing over the particle size range 2-100 μm.

TABLE 3

Particulate solids containing 20% by weight of non-polymeric material (pigment)

| Time above | Mean Circularity (2-100 μm) | |
|---|---|---|
| 90° C. (mins) | Particulate Solid 1 | Particulate Solid C1 |
| 20 | | 0.924 |
| 21 | 0.931 | |
| 50 | | 0.930 |
| 56 | 0.941 | |
| 81 | 0.944 | |
| 85 | | 0.938 |
| 101 | 0.945 | |
| 130 | | 0.940 |
| 151 | 0.947 | |
| 160 | | 0.942 |

TABLE 4

Particulate solids containing 5% by weight of non-polymeric material (pigment)

| Time above | Mean Circularity (2-100 μm) | |
|---|---|---|
| 90° C. (mins) | Particulate Solid 2 | Particulate Solid C2 |
| 5 | 0.955 | |
| 20 | 0.974 | |
| 35 | 0.987 | |
| 37 | | 0.921 |
| 50 | 0.991 | |
| 67 | | 0.934 |
| 80 | 0.993 | |
| 97 | | 0.941 |
| 125 | 0.994 | |
| 157 | | 0.955 |
| 187 | | 0.960 |
| 217 | | 0.967 |

Of course, circularities closer to 1.0 represent better coalesced and more spherical particles.

From FIG. 1 it can clearly be seen that the mean circularities for the Particulate Solid 1 (square-shaped data points) are consistently larger (more spherical) than for the Particulate Solid C1 (diamond-shaped data points) at equivalent coalescence times. The same is true for Particulate Solid 2 as compared against Particulate Solid C2, but to an even greater extent.

Thus, the present invention has provided a process which can achieve equivalent circularities whilst using milder coalescence conditions in step iv). This is not a Tg effect as the Tgs of the polymer used in Particulate Solid 1 and Comparative Particulate Solid C1 are essentially identical. It is also not an effect associated with multiphase or core/shell polymer particles because the polymer particles are single phase.

As an example, with reference to FIG. 1 if a mean circularity of 0.94 is required this corresponds to a coalescence time of 130 minutes above 90° C. for the Comparative Particulate Solid C1 as against only 50 minutes for the Particulate Solid 1 within the present invention. This is a substantial reduction in the coalescence time to approximately 38% of the time required by the analogous comparative particulate solid. Similarly, with reference to FIG. 2 if a mean circularity of 0.96 is required this takes a coalescence time of about 190 minutes for comparative Particulate Solid C2 but only 10 minutes for Particulate Solid 2. This is about 5% of the time required by the analogous comparative particulate solid. This demonstrates the dramatic benefits of the present invention.

Further particulate solids were prepared, using the Latexes, pigment levels and coalescence conditions shown in Table 5.

TABLE 5

Summary of Particulate solids prepared

| PS Ref | Latex | PD | % P | Target Fusion T (° C.) | Av Fusion T (° C.) | Peak Fusion T ° C. | dv50 μm | GSDv |
|---|---|---|---|---|---|---|---|---|
| PS 1 | 1 | P1 | 20 | 90 | 91.5 | 92.0 | 8.9 | 1.26 |
| PS 2 | 1 | P1 | 5 | 90 | 91.7 | 92.1 | 8.5 | 1.22 |
| PS 3 | 1 | P1 | 5 | 80 | 80.1 | 80.1 | 7.7 | 1.27 |
| PS 4 | 2 | P1 | 5 | 80 | 79.8 | 80.0 | 12.9 | 1.24 |
| PS 5 | 3 | P1 | 5 | 90 | 91.7 | 92.2 | 8.3 | 1.23 |
| PS 6 | 4 | P1 | 5 | 70 | 68.6 | 70.0 | 6.8 | 1.30 |
| PS C1 | C1 | P1 | 20 | 90 | 92.4 | 93.8 | 8.5 | 1.29 |
| PS C2 | C1 | P1 | 5 | 90 | 92.5 | 93.2 | 8.4 | 1.26 |
| PS C3 | C1 | P1 | 5 | 80 | 80.3 | 81.0 | 6.9 | 1.25 |
| PS C4 | C2 | P1 | 5 | 80 | 79.9 | 80.1 | 12.9 | 1.28 |
| PS C5 | C3 | P1 | 5 | 90 | 91.3 | 91.7 | 8.2 | 1.25 |
| PS C6 | C4 | P1 | 5 | 70 | 69.0 | 70.4 | 6.7 | 1.29 |

Figure 3:
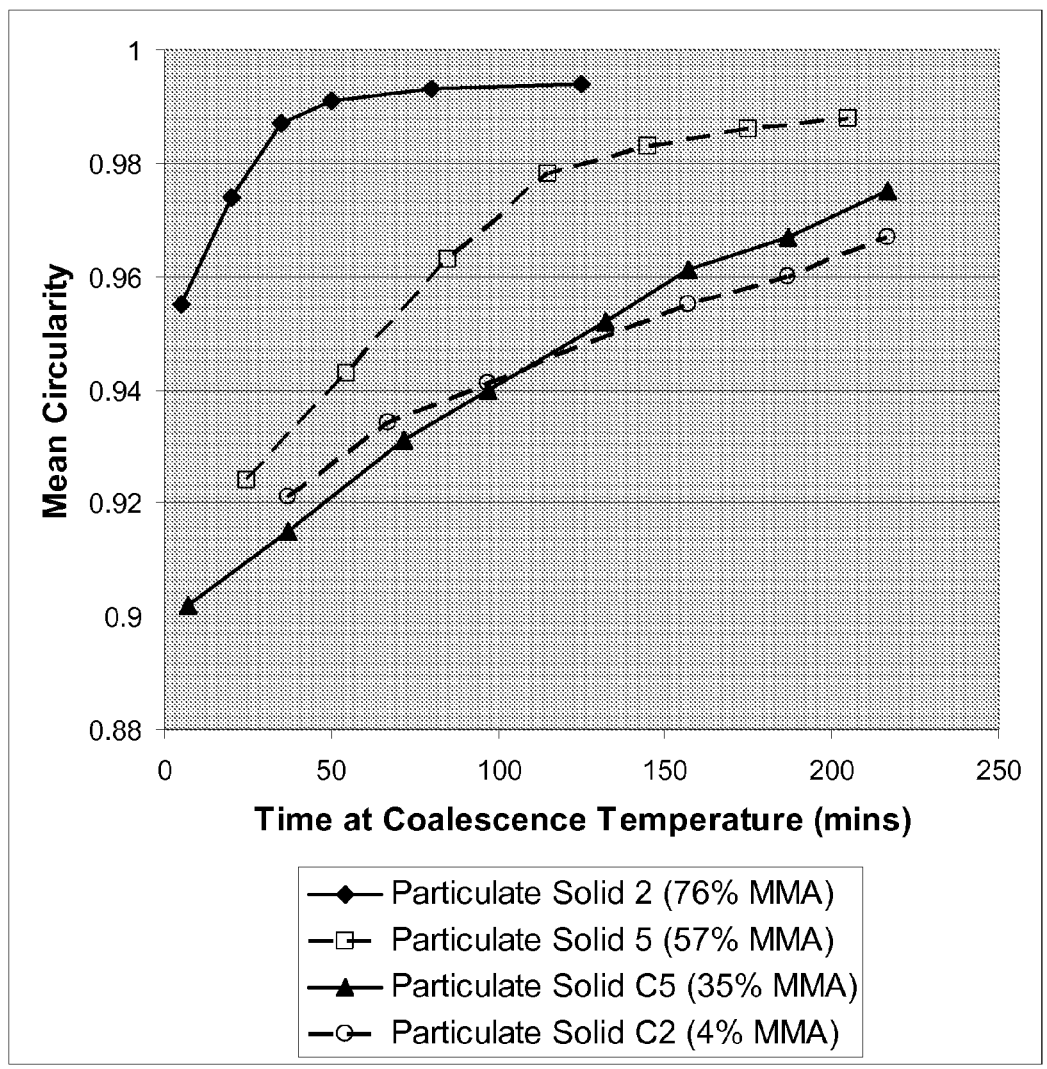
FIG. 3 shows the mean circularity (y co-ordinate) for Particulate Solids 2, 5, C5 and C2 plotted against the coalescence time above 90° C. (x co-ordinate).

In Table 5:
PS is an abbreviation of particulate solid, so PS1 is Particulate Solid 1
PD is an abbreviation of Pigment Dispersion
% P means the percentage by weight of pigment in the final particulate solid Table 6 and FIG. 3 show the mean circularities as a function of time at a coalescence temperature of 90° C. for Particulate Solids 2, 5, C5 and C2 with approximate MMA levels in the latex of 76%, 57%, 35% and 4% by weight respectively and a pigment level of 5% by weight.

TABLE 6

Mean Circularity versus Time at Coalescence Temperature For Particulate Solids 2, 5, C2 and C5

| Time at Coalescence Temperature (mins) | Particulate Solid 2 | Particulate Solid 5 | Particulate Solid C2 | Particulate Solid C5 |
|---|---|---|---|---|
| 5 | 0.955 | | | |
| 7 | | | | 0.902 |
| 20 | 0.974 | | | |
| 25 | | 0.924 | | |
| 35 | 0.987 | | | |
| 37 | | | 0.921 | 0.915 |
| 50 | 0.991 | | | |
| 55 | | 0.943 | | |
| 67 | | | 0.934 | |
| 72 | | | | 0.931 |
| 80 | 0.993 | | | |
| 85 | | 0.963 | | |
| 97 | | | 0.941 | 0.940 |
| 115 | | 0.978 | | |
| 125 | 0.994 | | | |
| 132 | | | | 0.952 |
| 145 | | 0.983 | | |
| 157 | | | 0.955 | 0.961 |
| 175 | | 0.986 | | |
| 187 | | | 0.960 | 0.967 |
| 205 | | 0.988 | | |
| 217 | | | 0.967 | 0.975 |

Figure 4:
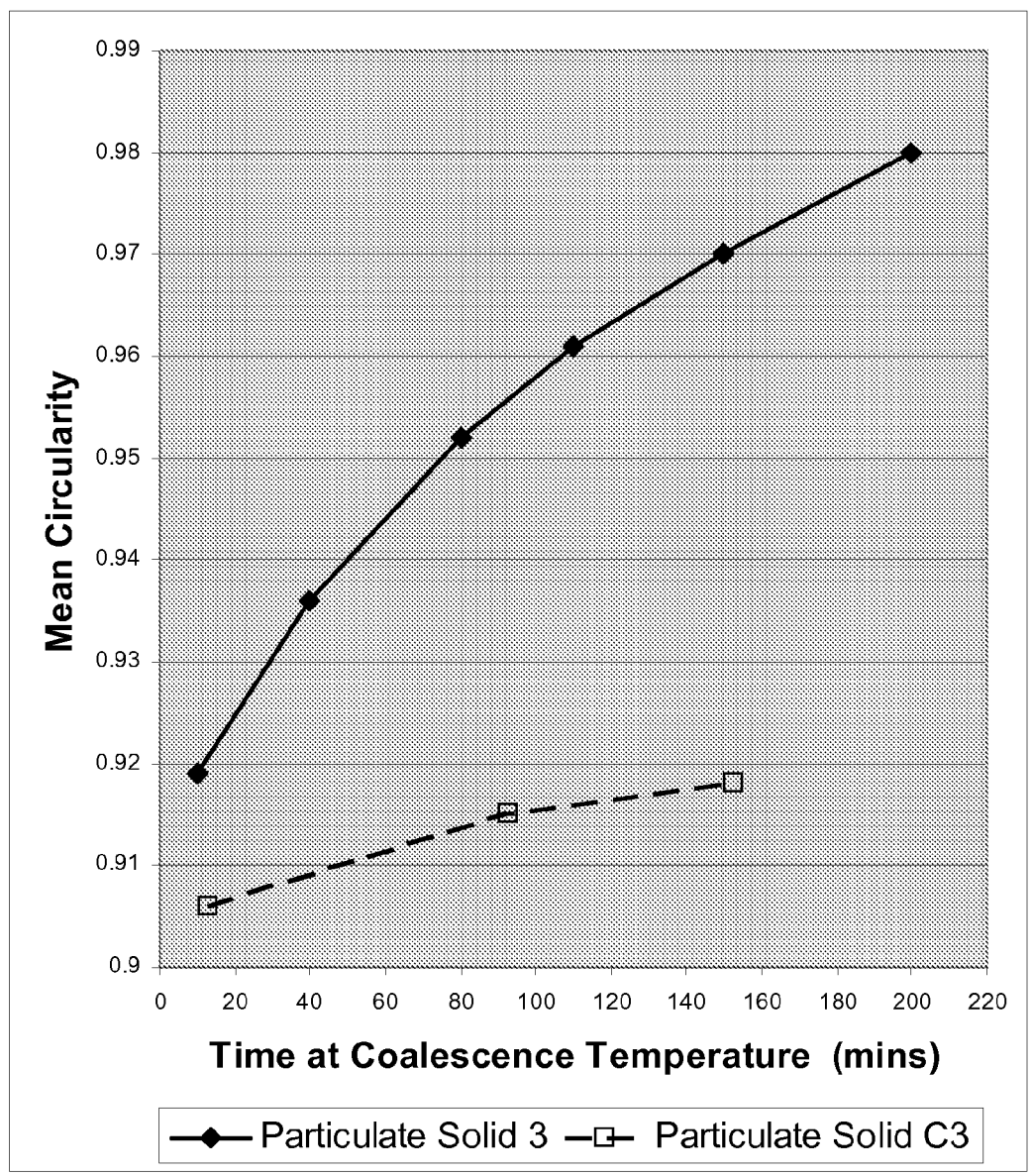
FIG. 4 shows the mean circularity (y co-ordinate) for Particulate Solids 3 and C3 plotted against the coalescence time above 80° C. (x co-ordinate).

Table 7 and FIG. 4 show the mean circularity versus time at coalescence temperature for Particulate Solids 3 and C3, with a coalescence temperature of 80° C. and 5% pigment.

TABLE 7

Mean Circularity versus Time at Coalescence Temperature For Particulate Solids 3 and C3

| | Mean Circularity | |
|---|---|---|
| Time at Coalescence Temperature (mins) | Particulate Solid 3 | Particulate Solid C3 |
| 10 | 0.919 | |
| 13 | | 0.906 |
| 40 | 0.936 | |
| 80 | 0.952 | |
| 93 | | 0.915 |
| 110 | 0.961 | |
| 150 | 0.970 | |
| 153 | | 0.918 |
| 200 | 0.980 | |

Figure 5:
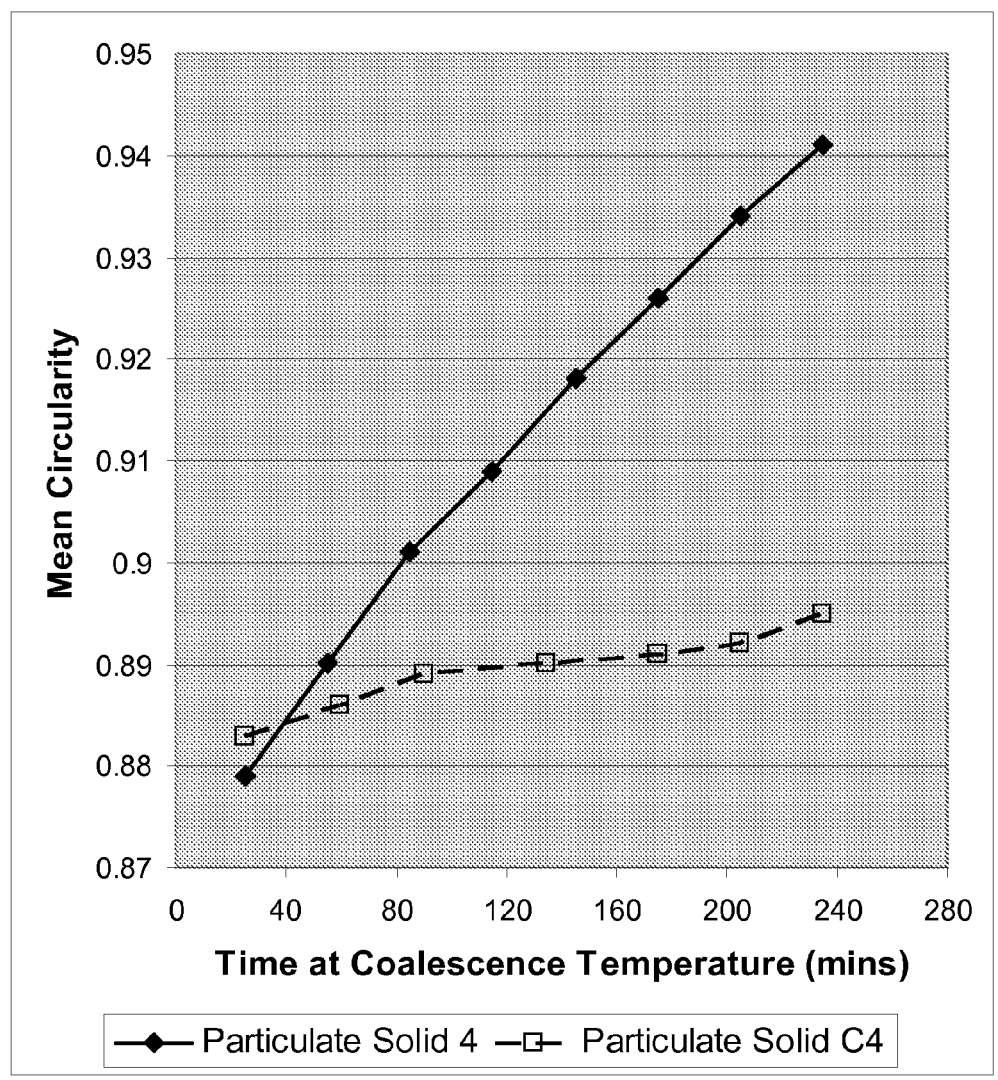
FIG. 5 shows the mean circularity (y co-ordinate) for Particulate Solids 4 and C4 plotted against the coalescence time above 80° C. (x co-ordinate).

Table 8 and FIG. 5 show the mean circularity versus time at coalescence temperature for Particulate Solids 4 and C4, with a coalescence temperature of 80° C. and 5% pigment. The particle size of Particulate Solids 4 and C4 is substantially larger than those of Particulate Solids 3 and C3.

TABLE 8

Mean Circularity versus Time at Coalescence Temperature For Particulate Solids 4 and C4

| | Mean Circularity | |
|---|---|---|
| Time at Coalescence Temperature (mins) | Particulate Solid 4 | Particulate Solid C4 |
| 25 | 0.879 | 0.883 |
| 55 | 0.890 | |
| 60 | | 0.886 |
| 85 | 0.901 | |
| 90 | | 0.889 |
| 115 | 0.909 | |
| 135 | | 0.890 |
| 145 | 0.918 | |
| 175 | 0.926 | 0.891 |
| 205 | 0.934 | 0.892 |
| 235 | 0.941 | 0.895 |

Figure 6:
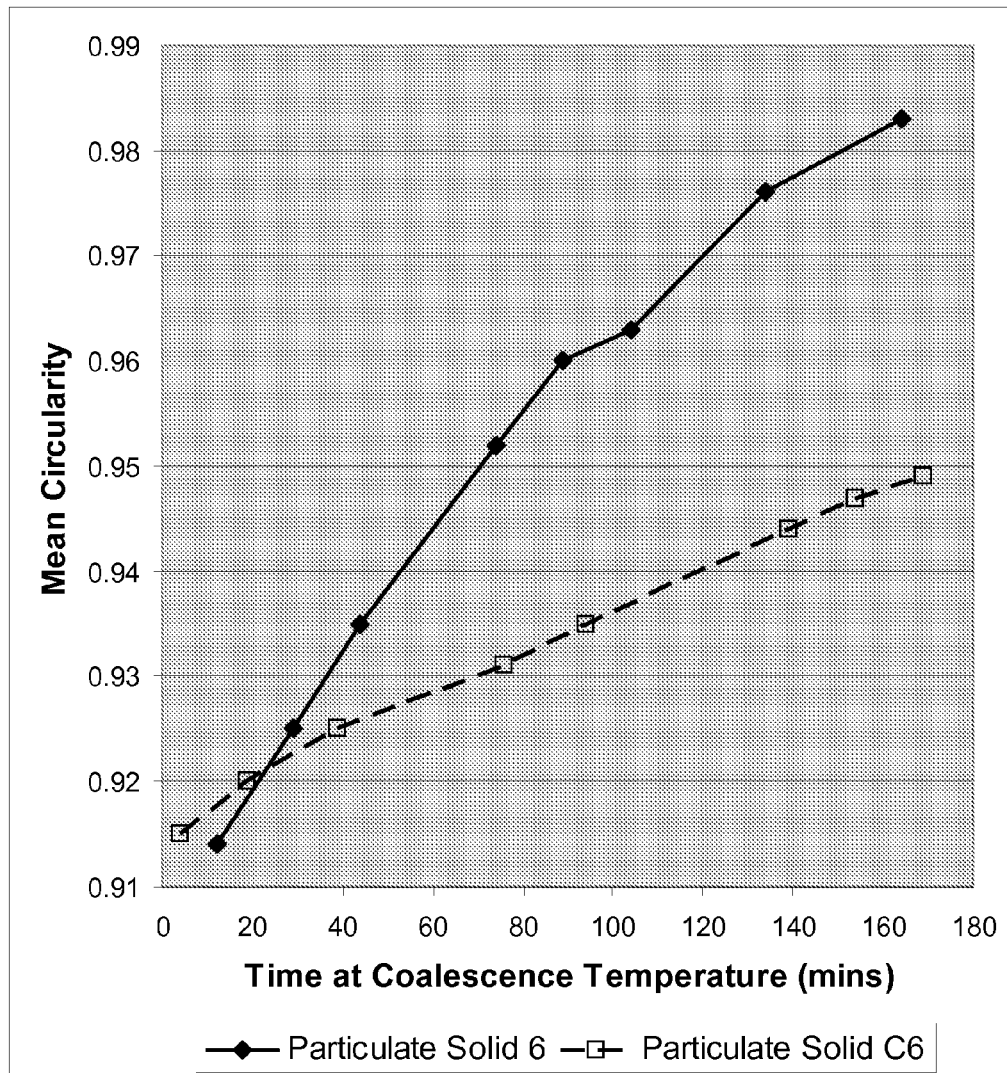
FIG. 6 shows the mean circularity (y co-ordinate) for Particulate Solids 6 and C6 plotted against the coalescence time above 70° C. (x co-ordinate).

Table 9 and FIG. 6 show the mean circularity versus time at coalescence temperature for Particulate Solids 6 and C6, with a coalescence temperature of 70° C. and 5% pigment.

TABLE 9

Mean Circularity versus Time at Coalescence Temperature For Particulate Solids 6 and C6

| | Mean Circularity | |
|---|---|---|
| Time at Coalescence Temperature (mins) | Particulate Solid 6 | Particulate Solid C6 |
| 4 | | 0.915 |
| 12 | 0.914 | |
| 19 | | 0.920 |
| 29 | 0.925 | |
| 39 | | 0.925 |
| 44 | 0.935 | |
| 74 | 0.952 | |
| 76 | | 0.931 |
| 89 | 0.960 | |
| 94 | | 0.935 |
| 104 | 0.963 | |
| 134 | 0.976 | |

TABLE 9-continued

Mean Circularity versus Time at Coalescence Temperature
For Particulate Solids 6 and C6

| Time at Coalescence Temperature (mins) | Mean Circularity | |
|---|---|---|
| | Particulate Solid 6 | Particulate Solid C6 |
| 139 | | 0.944 |
| 154 | | 0.947 |
| 164 | 0.983 | |
| 169 | | 0.949 |

Accordingly, the process of the present invention is markedly more energy efficient and can be used with non-polymeric materials which are significantly more thermally and/or hydrolytically unstable.

The invention claimed is:

1. A process for preparing a particulate solid comprising the steps i) to iv):
   i) providing a dispersion of polymer particles in a liquid medium, said polymer being obtained or obtainable by the copolymerisation of at least the monomers in components a) to d):
   a) 45 to 90 parts of one of more hydrocarbyl (meth) acrylates each having a homopolymer Tg of from 90 to 130° C. and having no hydrophilic groups;
   b) 10 to 55 parts of one or more ethylenically unsaturated monomers each having homopolymer Tg of below 90° C. and having no hydrophilic groups;
   c) 0 to 40 parts of one or more styrenic monomers having a homopolymer Tg of at least 90° C. and having no hydrophilic groups;
   d) 0 to 10 parts of one or more ethylenically unsaturated monomers each having at least one hydrophilic group;
   wherein all the parts are by weight; and
   the polymer particles are stabilised by a surfactant which at least partially adsorbs onto the surface of the polymer particles and the surfactant has one or more carboxylic acid groups;
   ii) associating the particles to form clusters of particles by adjusting the pH of the liquid medium by the addition of an acid;
   iii) optionally stabilising the clusters, against further association, broadening of particle size distribution or growth in particle size by addition of further surfactant, and/or by a change in pH to convert reversibly ionisable groups to ionic form;
   iv) heating the clusters above the glass transition temperature of the polymer in the polymer particles in step i).

2. The process according to claim 1 wherein the polymer in the polymer particles in step i) has a glass transition temperature of from 20 to 70° C.

3. The process according to claim 1 wherein a) is from 50 to 90 parts and b) is from 10 to 50 parts.

4. The process according to claim 1 wherein the polymer in the polymer particles in step i) is obtained or obtainable by the copolymerisation of:
   60 to 90 parts of component a)
   10 to 40 parts of component b)
   0 to 40 parts of component c)
   0 to 5 parts of component d)
   wherein all the parts are by weight.

5. The process according to claim 1 wherein the polymer in the polymer particles in step i) is obtained or obtainable by the copolymerisation of:
   60 to 90 parts of component a)
   10 to 40 parts of component b)
   0 to 40 parts of component c)
   0.1 to 5 parts of component d)
   wherein all the parts are by weight.

6. The process according to claim 1 wherein the heating step iv) is performed at a temperature of from 50 to 100° C.

7. The process according to claim 1 wherein the clusters in step iv) are heated for no more than 3 hours.

8. The process according to claim 1 wherein:
   a) the dispersion in step i) comprises one or more non-polymeric particles; and/or
   b) the polymer particles have dissolved and/or dispersed within them a non-polymeric material; and/or
   c) the dispersion in step i) comprises further polymer particles which are obtained or obtainable by copolymerising the components other than a) to d) in the proportions stated in step i) which have dissolved and/or dispersed within them a non-polymeric material.

9. The process according to claim 8 wherein the weight ratio of the non-polymeric material to the polymeric material is from 1:99 to 60:40.

10. The process according to claim 8 wherein the weight ratio of the non-polymeric material to polymeric material is from 15:85 to 60:40.

11. The process according to claim 1 wherein the polymer particles have a single polymer phase.

12. The process according to claim 1 wherein the polymer particles comprise only polymers which have no anionic groups.

13. The process according to claim 1 wherein all the polymers present in the dispersion in step i) are obtained or obtainable by the copolymerising the components a) to d) in the proportions mentioned.

14. The process according to claim 1 wherein the polymer particles present in step i) comprise one or more polymers having hydroxy groups.

15. The process according to claim 1 wherein the number average circularity value for the final particulate solid is from 0.80 to 0.98.

16. The process according to claim 1 wherein the final particulate solid has a volume averaged particle size of from 1 to 15 microns in diameter.

17. The process according to claim 1 wherein component a) is or comprises methyl methacrylate.

18. The process according to claim 1 wherein component d) is or comprises a hydroxy functional (meth)acrylate.

19. The process according to claim 1 wherein the liquid medium is aqueous.

20. The process according to claim 1 wherein the particulate solid is isolated from the liquid medium to obtain a dry powder.

21. The particulate solid obtained or obtainable by the process according to any one of the preceding claims.

22. A dispersion of polymer particles in an aqueous liquid medium, said polymer being obtained or obtainable by the copolymerisation of at least the monomers in components a) to d):
   a) 45 to 90 parts of one of more hydrocarbyl (meth) acrylates each having a homopolymer Tg of from 90 to 130° C. and having no hydrophilic groups;
   b) 10 to 55 parts of one or more ethylenically unsaturated monomers each having homopolymer Tg of below 90° C. and having no hydrophilic groups;

c) 0 to 40 parts of one or more styrenic monomers having a homopolymer Tg of at least 90° C. and having no hydrophilic groups;
d) 0 to 10 parts of one or more ethylenically unsaturated monomers each having at least one hydrophilic group;

wherein all the parts are by weight and the polymer particles are stabilised by a surfactant which at least partially adsorbs onto the surface of the polymer particles and the surfactants have one or more carboxylic acid groups.

* * * * *